United States Patent [19]
Droegemueller

[11] 3,882,883
[45] May 13, 1975

[54] CLOSED-OPEN CENTER HYDRAULIC VALVE ASSEMBLY

[75] Inventor: James T. Droegemueller, Welcome, Minn.

[73] Assignee: Fairmont Railway Motors, Inc., Fairmont, Minn.

[22] Filed: Nov. 19, 1973

[21] Appl. No.: 417,410

[52] U.S. Cl. ...... 137/270; 137/614.14; 137/625.17; 137/625.48; 137/625.69; 137/636.4; 251/324
[51] Int. Cl. .......................... F16k 11/07; F16k 3/24
[58] Field of Search............ 137/270, 270.5, 614.13, 137/614.14, 625.17, 625.48, 625.49, 625.69, 636.4; 251/290, 324

[56] References Cited
UNITED STATES PATENTS

| | | |
|---|---|---|
| 3,146,795 | 9/1964 | Retallick........................ 137/625.17 |
| 3,174,510 | 3/1965 | Nelson............................ 137/625.69 |
| 3,285,141 | 11/1966 | Palmer....................... 137/625.17 X |

*Primary Examiner*—Alan Cohan
*Assistant Examiner*—Gerald A. Michalsky
*Attorney, Agent, or Firm*—Neuman, Williams, Anderson & Olson

[57] ABSTRACT

A universal valve for use in either "constant pressure" or "constant volume" fluid control systems, e.g., an "on-off" hydraulic valve for a hydraulically driven hand tool, comprises a valve body, a valve spool and means for reciprocally moving the spool between predetermined "off" and "on" positions in the valve body. The valve body comprises a housing having a plurality of chambers and an interrupted bore between the chambers for receiving the valve spool. The wall of the bore between two of the chambers is obliquely aligned with the axis of the bore so as to present a longitudinally offset surface. The valve spool has a land thereon which cooperates with the obliquely aligned surface of the bore so that in the "off" position the land seals the passage between the chambers in at least a first angular position of the spool and allows fluid flow between the chambers in at least a second angular position of the spool. In the "on" position the land allows fluid flow between the chambers in both angular dispositions. The means for reciprocally moving the spool between the "off" and "on" positions includes means for selectively and releasably securing the spool in the first or the second angular positions, preferably by merely rotating the spool while in the bore between the two positions.

10 Claims, 8 Drawing Figures

1

CLOSED-OPEN CENTER HYDRAULIC VALVE ASSEMBLY

BACKGROUND OF THE INVENTION

1. Field of the Invention

This invention relates to a valve for the control of fluid flow such as an "off-on" hydraulic valve in a hydraulically driven hand tool, e.g., a chain saw or the like. More specifically, it relates to a universal type "off-on" valve which may be used interchangeably with either constant pressure or constant volume fluid systems without requiring that the valve be disassembled or components thereof replaced.

While the present invention is described with particular reference to a three-chamber hydraulic valve assembly of the type which may be used to control hand tools, it should be understood that the invention is not necessarily limited thereto. The inventive concept set forth herein can be readily adapted for use with other fluids, gaseous as well as liquid, and in other systems other than hydraulically controlled hand tools, as those skilled in the art will recognize in the light of the present disclosure.

2. Description of the Prior Art

Hydraulically operated hand tools are used with two basic types of hydraulic systems as the power source, i.e., the constant volume system and the constant pressure system. In the constant volume system, the "on-off" hydraulic valve must employ an open center spool so that in the "off" or neutral position the hydraulic oil is free to flow uninterruptedly through the valve and back to the power source. In contrast, in the constant pressure system, the on-off hydraulic valve must employ a closed center spool so that in the off or neutral position the flow of oil is blocked so that system pressure can be substantially maintained.

Many users of such tools have both constant pressure and constant volume hydraulic power sources; and it would be highly desirable to be able to use the hand tools interchangeably with either system. At present, it is quite common to have duplicate tools in order to be able to accommodate either system. This requires a double inventory by the manufacturer, the distributor and the user. It increases capital costs, storage costs, ties up needed space on trucks and the like and can lead to costly time wastage if only one tool is brought to the job site and it turns out to be the wrong tool for the power system.

One possible remedy is to design the tool to accommodate interchangeable valve spools, one with an open center for a constant volume system and one with a closed center for a constant pressure system. The operator could then select and install the particular spool to match the power source. In practice, however, the proper spool may not always be readily available to match the power source. If available, it would require considerable time to disassemble the valve, remove one spool, substitute the other spool and reassemble the valve.

Not only would this practice be very time-consuming and thus costly, it would require the proper tools, and someone with the skill to do it properly. The spool which is removed would be left unprotected and subject to loss. It would also present the possibility of damaging or losing components of the valve, e.g., springs, seals, and the like. It also unnecessarily would disturb the hydraulic seals and provide an opportunity for grit, dirt and other deleterious substances to be introduced into the hydraulic system. As often said, if it's possible for something to go wrong, it will.

The present invention is directed to the solution of these problems, as reflected in the following objects.

OBJECTS OF THE INVENTION

It is therefore a general object of the present invention to provide a fluid-powered hand tool which can be used with either constant volume or constant pressure fluid power systems. It is another general object to provide an improved on-off valve for controlling the flow of fluids. It is another general object to provide a time-saving hydraulic valve which may be used in either constant volume or constant pressure systems. It is another general object to provide an all-in-one on-off hydraulic valve featuring both a closed center and open center configuration.

It is a specific object to provide a valve assembly for hydraulic systems wherein the same spool may be used for either constant volume or constant pressure systems. It is another specific object to provide a hydraulic valve that can be changed from open center to a closed center configuration, or vice versa, without removing the spool or otherwise disassembling the valve. It is another specific object to provide a hydraulic valve assembly which may be quickly converted from an open center to a closed center configuration without special tools or skills or running the risk of damaging or losing the components or contaminating the valve assembly or creating leakage problems.

These and other objects will become apparent as the detailed description proceeds.

SUMMARY OF THE INVENTION

These objects are achieved by a valve assembly comprising a novel valve body and valve spool and means for reciprocally moving the spool between predetermined off and on positions in the valve body. The valve body comprises a housing having a plurality of chambers and an interrupted bore for receiving the valve spool and connecting the chambers so as to provide fluid communication therebetween, depending upon reciprocal movement of the spool and the angular disposition thereof about the common axis of the spool and bore.

Typically, the chambers include a receiving chamber having an inlet for receiving fluid from a source thereof and an adjacent chamber disposed to receive the fluid from the receiving chamber via the bore. The walls of the bore between the receiving chamber and the adjacent chamber are obliquely aligned with the axis of the bore so as to present a longitudinally offset surface, e.g., at an angle of about 30° to 80° relative to the axis, or between about 10° and about 60° relative to a plane perpendicular to the axis, depending in part on the diameter of the bore and valve spool. In a typical embodiment the angle of offset may be about 15° to 40° relative to a plane perpendicular to the axis, e.g., about 25°.

The valve spool is of conventional construction except that at least one of the lands thereon is uniquely configured to cooperate with the obliquely aligned wall of the bore. In the off position the land sealingly registers with the obliquely aligned wall in a first angular position of the spool whereby the passage of the bore between the receiving and adjacent chambers is closed to fluid flow. Also, in the off position, the land is out of sealing registration with at least a substantial portion of the obliquely aligned wall in at least a second position of the spool about the common axis whereby the fluid may flow through the passages of the bore between the receiving chamber and the adjacent chamber. In the on position, the land is out of sealing registration with at least a substantial portion of the obliquely aligned wall in both the first and second angular dispositions of the spool, thus again permitting fluid flow.

The means for reciprocally moving the spool between the off and on positions includes means for selectively and releasably securing the spool in either the first angular position or the second angular position. As will be apparent in the drawings, the spool may be readily moved between the first angular position and the second angular position without disassembling the valve or removing the spool merely by releasing the securing means rotating the spool to the desired position and then resecuring the spool. In a preferred embodiment the two angular positions are 180° apart.

In a specific embodiment, the spool is resiliently biased to the off position, typically by means of a conventional spring inserted in the valve housing. Also in the specific embodiment, the uniquely configured land on the spool is shaped as an obliquely truncated right circular cylinder, the obliquely truncated extremity being in a direction of the receiving chamber. The angle of the obliquely truncated extremity relative to the common axis of the spool is preferably the same as the obliquely aligned wall so that the two may be in registration when in the closed center configuration.

So as to balance the forces acting on the spool, particularly in the constant pressure configuration, the spool has at least a second similarly obliquely truncated cylindrical land in opposed and spaced relationship from the obliquely truncated extremity of the first land. In a sense, the two opposed obliquely truncated cylindrical lands might be considered as a right circular cylinder dissected by an oblique plane and separated or spaced by a portion of the spool.

In a typical embodiment, the valve housing contains at least three chambers in general alignment along the bore, e.g., a receiving chamber, an adjacent or intermediate step chamber, and a return chamber. In such case, in the on position a portion of the first land of the spool may sealingly register with the surface of the bore between the intermediate chamber and the return chamber whereby the bore between these chambers is substantially closed to fluid flow. This configuration is set forth in the drawings.

BRIEF DESCRIPTION OF THE DRAWINGS

The present invention will be more clearly understood from the following detailed description of a specific embodiment, read in conjunction with the accompanying drawings, wherein.

It should be understood that the drawings are not necessarily to scale and that the embodiment is not depicted in its commercial configuration. For example, the valve body is shown as a separate entity whereas it is advantageously integrally incorporated as part of the handle or adjacent structure of the hydraulic tool which it is controlling. It should also be understood that graphic symbols and diagrammatic representations may also be used. Details which are not necessary to an understanding of the present invention or which may render other details difficult to perceive may have been omitted. It should be understood, of course, that the invention is not necessarily limited to the embodiment illustrated herein.

DETAILED DESCRIPTION OF THE DRAWINGS, INCLUDING PREFERRED EMBODIMENT

Figure 1:
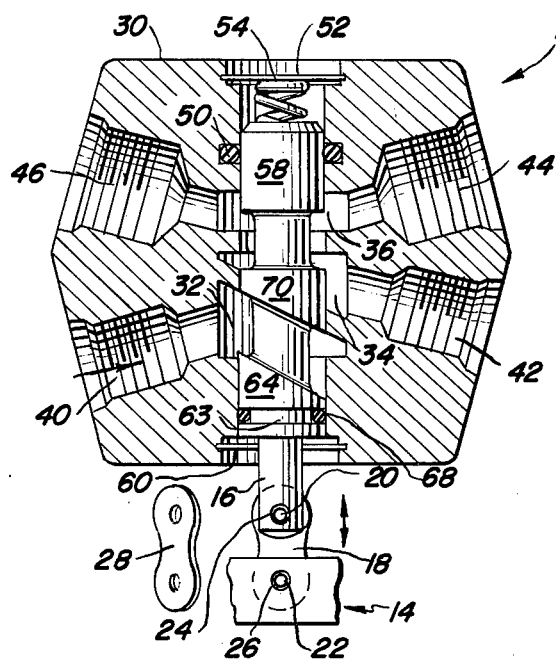
FIG. 1 is a fragmentary elevation view, partly in section, of a preferred embodiment of the present invention wherein the valve is assembled in the closed center or constant pressure configuration, the valve spool being shown in the off or neutral position.

Referring to the drawings, the valve comprises valve body 10, valve spool 12 and means for reciprocally moving the spool between off and on positions, e.g., actuating arm 14 (FIG. 1). Actuating arm 14 may be of conventional design and per se does not represent the patentable novelty of the present invention. It is configured to suit the particular tool handle or installation so as to provide a convenient means for actuating the valve, that is, moving the spool of the valve from the off to the on positions.

In FIG. 1, actuating arm 14 is linked to the external extremity 16 of spool 12 simply by means of removable link 18 having pins 20 and 22 which are inserted through the corresponding apertures 24 and 26 in spool extremity 16 and actuating arm 14, respectively. The link is held in place by snapping the apertures of plate 28 over pins 20 and 22, recesses adjacent the pin extremities holding plate 28 releasably in place. In practice, the removable link may conveniently comprise a simple bicycle-chain-type removable link, which can be quickly and readily removed and reinstalled without special tools or skills.

The valve body comprises a housing 30 having a plurality of chambers 32, 34 and 36 therein and an interrupted bore for receiving valve spool 12 and for connecting chambers 32, 34 and 36 whereby hydraulic oil may flow between adjacent chambers. The various segments of the interrupted bore are designated by reference numerals 38a through 38e. Chamber 32 has an inlet port 40 for receiving hydraulic fluid from a source thereof. That source may, of course, be either a constant pressure source or a constant volume source.

Chamber 32 is connected to chamber 34 by bore portion 38b, the extremities of which are obliquely aligned with the axis of bore 38 (rather than being perpendicular thereto, as in conventional designs) so as to present a longitudinally offset surface. In the embodiment of the drawings, bore portion 38b is offset approximately 25° from a plane perpendicular to the axis, or about 65° from the axis itself. As aforementioned, the offset may be about 10° to about 60° (or more) from a plane perpendicular to the axis, depending in part on the diameter of the bore and spool.

Intermediate chamber 34 receives hydraulic oil from receiving chamber 32 via passageway 38b and has an outlet 42 for delivering the hydraulic oil to the hydraulic tool which is being controlled by the off-on valve. Intermediate chamber 34 also is in fluid communication with return chamber 36 by means of the passageway formed by bore portion 38c. Return chamber 36 also has an inlet port 44 for receiving hydraulic fluid returning from the hydraulic tool being actuated. It also contains an outlet port 46 for returning the hydraulic oil to the reservoir of the hydraulic power source.

The discontinuous bore also has an annular slot 48 for receiving an O-ring seal 50 to prevent leakage between the spool and bore and yet permit relative movement of the spool along the bore. Valve housing 30 also has a plate 52 for retaining spring 54 within the bore. Spring 54 bears at one extremity against plate 52 and at the other extremity at the bottom of cylindrical recess 56 which is on the interior of land 58 of spool 12. Spring 54 is in compression and biases spool 12 to the neutral or off position, as depicted in FIGS. 1 and 3.

Housing 30 also includes apertured retaining plate 60 through which the valve extremity 16 protrudes and against which shoulder 62 of land 63 bears in the neutral or off position. Between lands 63 and 64, spool 12 has an annular groove 66 to accommodate O-ring 68 which performs essentially the same function as O-ring 50.

Land 70 of spool 12 is configured as an obliquely truncated circular cylinder, the obliquely truncated extremity 72 being in the direction of receiving chamber 32. The angle of the obliquely truncated extremity relative to the common axis of the spool and bore is the same as the angle of obliquely aligned wall portion 38b of bore 38. In a preferred embodiment the opposed wall 74 of land 64 is similarly obliquely truncated so as to present the same areas subject to the hydraulic pressure. As those skilled in the hydraulic arts will recognize, the opposed obliquely truncated walls thus substantially balance the fluid forces acting on the opposed ends of the lands. Spring 54 thus does not have to overcome any differential force to bias the spool to the neutral or off position.

Figure 2:
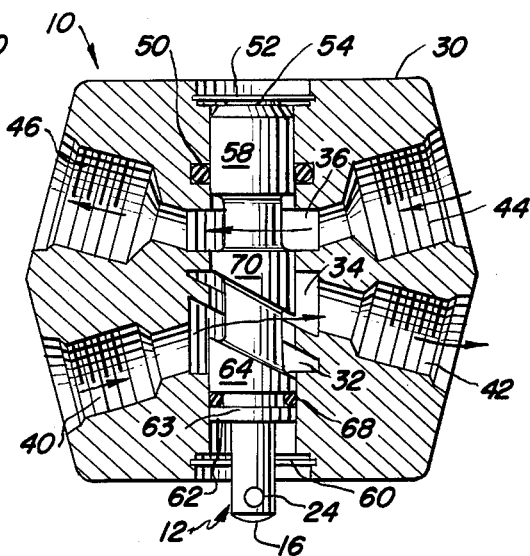
FIG. 2 is similar to FIG. 1 except that the valve spool is shown in the on position.
Figure 3:
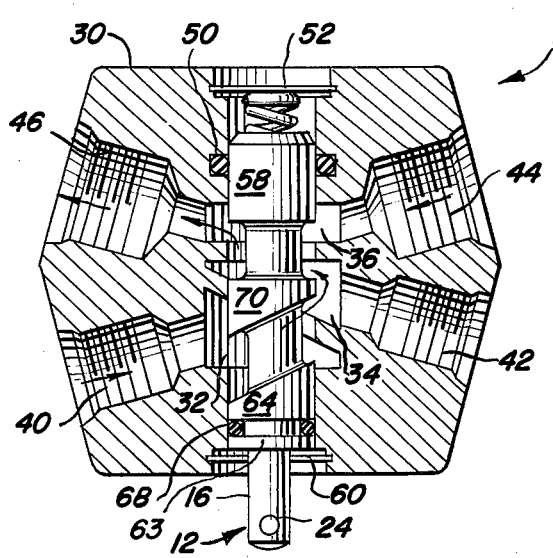
FIG. 3 is similar to FIG. 1 except that the valve spool has been rotated 180° within the bore so as to be disposed in the open center or constant volume configuration, the spool being shown in the off position.
Figure 4:
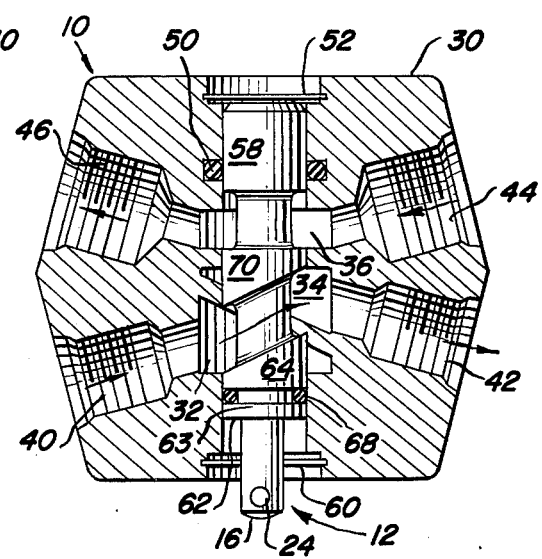
FIG. 4 is similar to FIG. 3 except that the spool is shown in the on position.
Figure 5:
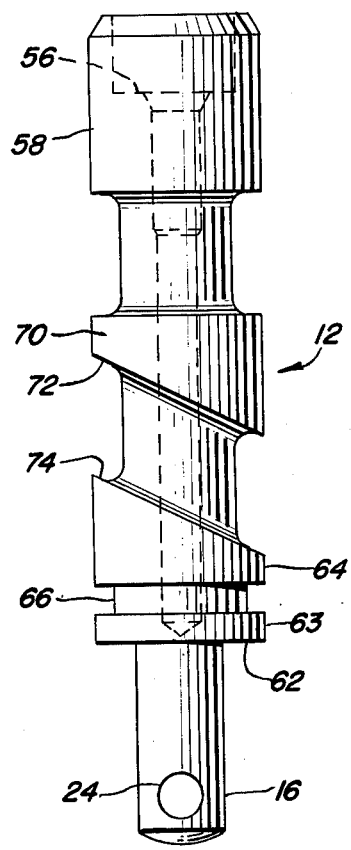
FIG. 5 is an elevation view on a magnified scale of the valve spool of FIGS. 1–4.
Figure 6:
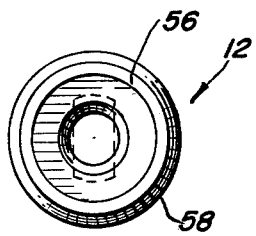
FIG. 6 is a plan or end view of the valve spool of FIG. 5.
Figure 7:
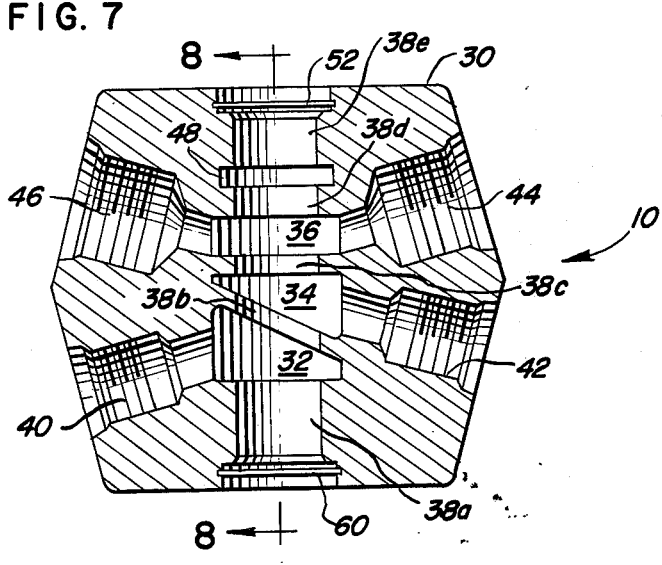
FIG. 7 is a sectional view of the valve body of FIGS. 1–4 with the spool removed.
Figure 8:
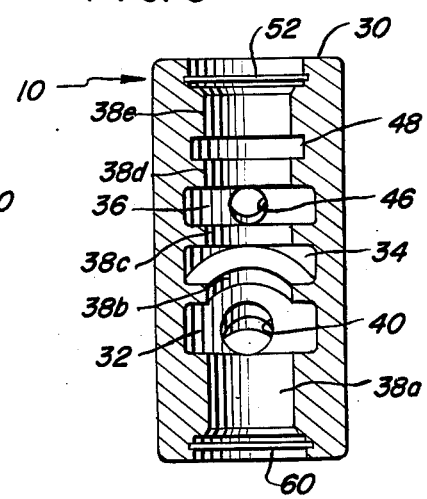
FIG. 8 is a sectional view along the line 8—8 of FIG. 7.

The unique operation of the valve of the present invention is evident from consideration of the closed center operation for constant pressure systems illustrated in FIGS. 1 and 2 and the open center configuration for constant volume systems, depicted in FIGS. 3 and 4.

Referring to the closed center configuration of FIGS. 1 and 2, hydraulic oil enters via inlet 40 and in the off position is restricted to chamber 32. The closed center configuration thus permits the hydraulic oil from the source to be maintained at constant pressure. When the valve spool 12 is moved to the on position as illustrated in FIG. 2, the hydraulic oil flows via inlet 40, chamber 32, passageway 38a, chamber 34, and then out via outlet 42 to the hydraulic tool being actuated. The hydraulic oil from the hydraulic tool returns via port 44, chamber 36, and outlet 46, whence the hydraulic oil is returned to the source. Oil cannot flow directly from chamber 34 into chamber 36 because land 70 of spool 12 seals passageway 38c in the on position.

To convert from the constant pressure, closed center configuration of FIGS. 1 and 2 to the constant flow, open center configuration of FIGS. 3 and 4, plate 28 is snapped off so that link 18 can be removed, as suggested in FIG. 1. Spool 12 is then rotated 180°, a rod being inserted in aperture 24 to obtain rotational leverage, if necessary. Link 18 and plate 28 are then reassembled; and the valve is ready for operation with a constant volume hydraulic power source.

In the off position of FIG. 3, oil flows via port 40, chamber 32, passageway 38b, chamber 34, passageway 38c, chamber 36, and outlet 46 back to the reservoir of the power source. In the on position of FIG. 4, oil passes via inlet 40, chamber 32, passageway 38b, chamber 34, and outlet 42 to the hydraulic tool. It returns to the reservoir of the power source via inlet 44, chamber 36, and outlet 46. As in the constant pressure configuration, the upper portion of land 70 seals passageway 38c when the spool is in the on position.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. A valve for use in fluid control systems comprising a valve body, a valve spool and means for reciprocally moving the spool between predetermined off and on positions in said valve body;

a. said valve body comprising a housing having a plurality of chambers therein and an interrupted bore for receiving said valve spool and connecting said chambers so as to provide fluid communication therebetween depending upon the reciprocal movement of said spool and the angular disposition thereof about the common axis of the spool and bore, said chambers including, i. a receiving chamber having an inlet for receiving fluid from a source thereof, and ii. an adjacent chamber disposed to receive the fluid from the receiving chamber via said bore, the walls of the bore between said receiving chamber and said adjacent chamber being obliquely aligned with the axis of the bore so as to present a longitudinally offset surface;

b. said valve spool having at least a first land thereon configured so that, i. in the off position said land sealingly registers with said obliquely aligned wall in at least a first angular disposition of the spool about said common axis whereby the passage of the bore between said receiving and said adjacent chambers is substantially closed to fluid flow, ii. in the off position said land is out of sealing registration with at least a substantial portion of said obliquely aligned wall in at least a second angular disposition of the spool about said common axis whereby the fluid may flow through the passage of the bore between said receiving chamber and said adjacent chamber, and iii. in the on position said land is out of sealing registration with at least a substantial portion of said obliquely aligned wall in both said first and said second angular dispositions of the spool; and c. said means for reciprocally moving the spool between the off and on positions including means for selectively and releasably securing said spool in said first angular disposition and in said second angular disposition.

2. The valve of claim 1 wherein said obliquely aligned wall is disposed at an angle of about 10° to about 60° relative to a plane perpendicular the axis of the bore.

3. The valve of claim 1 wherein said spool is resiliently biased to the off position.

4. The valve of claim 1 wherein said spool is cylindrical and said first and said second angular dispositions of the spool are 180° apart.

5. The valve of claim 1 wherein upon release of said means for selectively and releasably securing said spool, the spool may be rotated between said first and said second angular dispositions without removing the spool from said bore.

6. The valve of claim 1 wherein said land is configured as an obliquely truncated right circular cylinder, the obliquely truncated extremity being in the direction of said receiving chamber, the angle of the obliquely truncated extremity relative to the common axis of the spool and bore being the same as said obliquely aligned wall.

7. The valve of claim 6 wherein said spool includes at least a second similarly obliquely truncated cylindrical land in opposed and spaced relationship from the obliquely truncated extremity of said first land, and disposed so as to substantially balance the fluid forces acting on the end surfaces of the lands.

8. The valve of claim 1 including a return chamber in fluid communication via the bore with said adjacent chamber and wherein in the on position a portion of said first land sealingly registers with the surface of the bore between said adjacent and said return chambers whereby the bore between said adjacent and said return chambers is substantially closed to fluid flow.

9. A hydraulic valve for use in constant pressure and constant volume hydraulic systems comprising a valve body, a valve spool and means for reciprocally moving the spool between off and on positions in said valve body:
 a. said valve body comprising a housing having a plurality of chambers therein and an interrupted bore for receiving said valve spool and connecting said chambers and providing fluid communication therebetween depending upon the reciprocal movement of said spool and the angular disposition thereof about the common axis of the spool and bore, said chambers including,
  i. a receiving chamber having an inlet for receiving hydraulic fluid from a source thereof,
  ii. an intermediate chamber disposed to receive hydraulic fluid from the receiving chamber via said bore and having an outlet for delivering hydraulic fluid to a hydraulic tool, and
  iii. a return chamber disposed to receive hydraulic fluid from the intermediate chamber via said bore and having an inlet port for receiving hydraulic fluid returning from the hydraulic tool and an outlet for returning hydraulic fluid to the source thereof;
 the walls of the bore between said receiving chamber and said intermediate chamber being obliquely aligned with the axis of the bore so as to present a longitudinally offset surface;
 b. said valve spool having a land configured so that,
  i. in the off position said land sealingly registers with said obliquely aligned wall in at least a first angular disposition of the spool about said common axis whereby the passage along the bore between said receiving and said intermediate chambers is closed,
  ii. in the off position said land is out of sealing registration with at least a substantial portion of said obliquely aligned wall in at least a second angular disposition of the spool about said common axis whereby hydraulic fluid may flow through the passage along the bore from said receiving chamber to said intermediate chamber,
  iii. in the off position said land is out of sealing registration with the wall of the bore between said intermediate and said return chamber in both said first and said second angular dispositions of the spool, and whereby hydraulic fluid may flow directly along the bore from said intermediate chamber to said return chamber,
  iv. in the on position said land sealingly registers with the wall of the bore between said intermediate chamber and said return chamber in both said first and said second angular dispositions of the spool, and
  v. in the on position said land is out of sealing registration with at least a substantial portion of said obliquely aligned wall in both said first and said second angular dispositions of the spool;
 c. said means for reciprocally moving the spool between the off and on positions including means for selectively and releasably securing said spool in said first angular disposition and in said second angular disposition.

10. The hydraulic valve of claim 9 wherein said first and said second angular dispositions are 180° apart and upon release of said means for selectively and releasably securing said spool, the spool may be rotated therebetween without removing the spool from said bore.

* * * * *